United States Patent [19]

Srail et al.

[11] Patent Number: 5,194,469
[45] Date of Patent: Mar. 16, 1993

[54] LATEX FOR COATINGS HAVING IMPROVED FLEXIBILITY

[75] Inventors: Richard E. Srail, Cuyahoga Falls; Gary L. Burroway, Doylestown, both of Ohio

[73] Assignee: The Goodyear Tire & Rubber Company, Akron, Ohio

[21] Appl. No.: 662,091

[22] Filed: Feb. 28, 1991

[51] Int. Cl.$^5$ .............................................. C08L 9/08
[52] U.S. Cl. ..................... 524/166; 524/745; 526/225
[58] Field of Search ............... 524/166, 376, 428, 457

[56] References Cited

U.S. PATENT DOCUMENTS

| | | | |
|---|---|---|---|
| 3,242,121 | 3/1966 | Hill | 260/29.6 |
| 4,474,926 | 10/1984 | Burroway | 524/710 |
| 4,571,415 | 2/1986 | Jordan, Jr. | 524/428 |
| 4,668,639 | 5/1987 | Johannson | 436/518 |
| 4,968,741 | 11/1990 | Burroway et al. | 524/457 |

Primary Examiner—Paul R. Michl
Assistant Examiner—Andrew Merriam
Attorney, Agent, or Firm—Alvin T. Rockhill

[57] ABSTRACT

This invention relates to the synthesis of a latex which can be formulated into coatings having improved flexibility and good water resistance. Coatings of this type are particularly useful in roof coating applications because they offer excellent flexibility, excellent ultra-violet light resistance, and good water resistance. The subject invention more specifically discloses a process for producing a neutralized latex that is useful in the manufacture of water reducible coatings which comprises:

(1) free radical aqueous emulsion polymerizing, at a pH of less than about 3.5, a monomer mixture which comprises, based on 100 weight percent monomers: (a) from about 30 to about 70 weight percent vinyl aromatic monomers, (b) from about 25 to about 65 weight percent of at least one alkyl acrylate monomer, (c) from about 1 to about 5 weight percent of acrylic acid, and (d) about 0.4 to about 3 weight percent methacrylic acid, in the presence of about 0.2 to 0.4 phm at least one sulfonate surfactant and in the presence of about 4 to 8 phm of at least one nonionic surface active agent having a hydrophile-lipophile balance number which is within the range of about 12 to about 20 to produce a latex; and (2) neutralizing the latex with ammonia to a pH which is within the range of about 7 to about 10.5 to produce the neutralized latex.

20 Claims, No Drawings

LATEX FOR COATINGS HAVING IMPROVED FLEXIBILITY

BACKGROUND OF THE INVENTION

Most conventional coating resins are insoluble in water. Therefore, in general practice they have been dissolved in a suitable organic solvent or dispersed in water with the aid of an emulsifying agent or surfactant in order to provide a coating composition suitable for application to a substrate surface. A serious disadvantage of organic solvent solutions is that they are potentially toxic, flammable, and environmental pollutants.

Water reducible coatings do not present these problems and are, therefore, highly desirable. For this reason various water reducible coating resins, such as the one described in U.S. Pat. No. 4,474,926, have been developed. Water reducible coatings which utilize such resins have been developed for a variety of purposes and have been widely accepted in many applications such as highway striping paint.

U.S. Pat. No. 4,968,741 describes a coating for metal substrates which provides improved corrosion and rust resistance. Such coatings are of the water reducible type and can be beneficially utilized in the automotive industry and other applications where good rust resistance is needed. For instance, such coatings are excellent for coating bridges and other outdoor metal structures. There are many applications where it would be highly desirable for a water reducible coating to offer improved flexibility and ultra-violet light resistance in addition to good corrosion and rust resistance. For example, such a water reducible coating would be valuable in roof coating applications. This invention relates to such a water reducible coating which offers improved flexibility and ultraviolet light resistance in addition to outstanding corrosion and rust resistance.

For purposes of this patent application, an aqueous coating system is considered to be a colloidal dispersion of a resin in water which can be reduced by the addition of water and which forms a durable coating when applied to a substrate surface. The term aqueous coating system is used herein interchangeably with the term water reducible coating. Other names which are sometimes applied to water reducible coatings are water born, water solubilized, and water dilutable.

SUMMARY OF THE INVENTION

In practicing the process of this invention water based coating resins can be prepared by free radical emulsion polymerization using a unique combination of surfactant, cosolvent, and monomeric ingredients. After the emulsion polymerization has been completed, it is important to neutralize the latex with ammonia to a pH which is within the range of about 7 to about 10.5. This combination results in a latex which can be formulated into coatings having outstanding water resistance for both moisture vapor transmission and water spotting. Such coatings also exhibit improved low temperature flexibility and ultra-violet light resistance. When applied to metal substrates, coating formulations made with the latex of this invention provide excellent corrosion resistance, excellent flexibility and excellent ultra-violet light resistance. Accordingly, formulations which are highly desirable as coatings for metal roof surfaces can be made using this latex. Such metal roofs which are often made of aluminum are frequently found on mobile homes and house trailers. Such coating formulations can also beneficially be employed in coating asphalt roofs which have cracked and leak.

This invention specifically reveals a process for producing a neutralized latex that is useful in the manufacture of water reducible coatings which comprises:

(1) free radical aqueous emulsion polymerizing, at a pH of less than about 3.5, a monomer mixture which comprises, based on 100 weight percent monomers: (a) from about 30 to about 70 weight percent vinyl aromatic monomers, (b) from about 25 to about 65 weight percent of at least one alkyl acrylate monomer, (c) from about 1 to about 5 weight percent of acrylic acid, and (d) about 0.4 to about 3 weight percent methacrylic acid; in the presence of about 0.2 to 0.4 phm of at least one sulfonate surfactant and in the presence of about 4 to 8 phm of at least one water insoluble nonionic surface active agent having a hydrophilic-lipophile balance number which is within the range of about 12 to about 20 to produce a latex; and (2) neutralizing the latex with ammonia to a pH which is within the range of about 7 to about 10.5 to produce the neutralized latex.

In carrying out the process of this invention, monomeric ingredients can be fed into the reaction media continuously throughout the course of the polymerization reaction to produce a more uniform composition and to avoid the formation of water soluble block copolymers of the carboxylic acid group containing monomers. The sulfonate surfactant found most useful in the practice of this invention is sodium dodecyl benzene sulfonate. Triton® X-165 is a highly preferred nonionic surface active agent which is available from Rohm and Haas. Triton® X-165 has a hydrophile-lipophile balance number which is calculated to be 15.8.

DETAILED DESCRIPTION OF THE INVENTION

The latices of this invention are prepared by free radical emulsion polymerization. The charge compositions used in the preparation of the latices of this invention contain monomers, at least one sulfonate surfactant, at least one water insoluble nonionic surface active agent having a hydrophilic-lipophile balance number which is within the range of about 12 to about 20 and at least one free radical initiator. The monomer charge composition used in such polymerizations is comprised of (a) from about 30 to about 70 weight percent vinyl aromatic monomers, (b) from about 25 to about 65 weight percent of at least one alkyl acrylate monomer, (c) from about 1 to about 5 weight percent of acrylic acid, and (d) from about 0.4 to about 3 weight percent methacrylic acid. It is preferred for the polymer being synthesized to be comprised of from about 40 to about 60 weight percent vinyl aromatic monomers, from about 35 to about 55 weight percent alkyl acrylate monomers, from about 1 to about 3 weight percent acrylic acid, and from about 0.6 to about 2 weight percent methacrylic acid. It is more preferred for the polymer to be comprised of from about 47 weight percent to 57 weight percent vinyl aromatic monomers, from about 40 to about 50 weight percent alkyl acrylate monomers, from about 1.5 to about 2.5 weight percent acrylic acid, and from about 0.8 to about 1.5 weight percent methacrylic acid.

Some representative examples of vinyl aromatic monomers which can be used include styrene, alpha-methyl styrene, and vinyl toluene. Styrene and alpha-methyl styrene are the preferred vinyl aromatic monomers. Due to its relatively low cost styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer.

The charge composition used in the preparation of the latices of this invention will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.2 phm (parts per hundred parts of monomer) to about 0.4 phm of at least one sulfonate surfactant. At least about 0.2 phm of the sulfonate surfactant must be employed because the utilization of lesser amounts results in very slow rates of polymerization and a particle size which is too large to be used in making good films. It is not desirable to utilize more than about 0.4 phm of the sulfonate surfactant because poor freeze-thaw stability results. It is normally preferred for the sulfonate surfactant to be present in the polymerization medium at a level within the range of about 0.25 phm to about 0.35 phm. It is generally more preferred for the charge composition to contain from about 0.28 to about 0.32 phm of the phosphate ester surfactant.

The sulfonate surfactants that are useful in this invention are commercially available from a wide variety of sources. For instance, DuPont sells sodium alkylarylsulfonate under the tradename Alkanol TM, Browning Chemical Corporation sells sodium dodecylbenzene sulfonates under the tradename Ufaryl TM DL-85, and Ruetgers-Nease Chemical Company sells sodium cumene sulfonate under the tradename Naxonate Hydrotrope TM. Some representative examples of sulfonate surfactants which can be used include sodium toluenexylene sulfonate, sodium toluene sulfonate, sodium cumene sulfonates, sodium decyldiphenylether sulfonate, sodium dodecylbenzenesulfonate, sodium dodecyldiphenylether sulfonate, sodium 1-octane sulfonate, sodium tetradecane sulfonate, sodium pentadecane sulfonate, sodium heptadecane sulfonate, and potassium toluene sulfonate.

Metal salts of alkylbenzene sulfonates are a highly preferred class of sulfonate surfactant. The metal will generally be sodium or potassium with sodium being preferred. Sodium salts of alkylbenzene sulfonates have the structural formula:

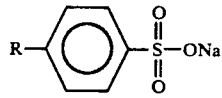

wherein R represents an alkyl group containing from 1 to about 20 carbon atoms. It is preferred for the alkyl group to contain from about 8 to about 14 carbon atoms.

Nonionic surfactants having a hydrophile-lipophile balance (HLB) number of about 12 to about 20 can be utilized as the water insoluble nonionic surface active agent. It is generally preferred for such nonionic surfactants to have a HLB number which is within the range of about 14 to about 18. This is because the utilization of nonionic surfactants having HLB numbers of less than about 12 results in the formation of gel during polymerization. The utilization of nonionic surfactants having HLB numbers of greater than 20 results in water sensitivity. It is more preferred for the nonionic surfactant to have a HLB number which is within the range of 15 to 17.

HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed. Water insoluble nonionic surfactants which contain low levels (from about 8 to about 50) ethylene oxide repeat units can be employed. These water insoluble nonionic surfactants can have the structural formula:

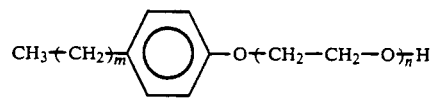

wherein n is an integer from about 8 to about 50 and wherein m is an integer from about 6 to about 12. It is normally preferred for m to be 8 or 9 and for n to average from 12 to 20. Rohm & Haas sells a nonionic surfactant of this type wherein n averages 16 under the tradename Triton TM X-165. The HLB number of such compounds increases with increasing levels of ethylene oxide incorporation. The HLB number of such compounds increases as a function of n as follows:

| n | HLB Number |
| --- | --- |
| 1 | 3.6 |
| 3 | 7.8 |
| 4 | 10.4 |
| 10 | 13.5 |
| 16 | 15.8 |
| 30 | 17.3 |
| 40 | 17.9 |

The use of larger amounts of sulfonate surfactants in the polymerization medium leads to better latex stability. However, the utilization of larger amounts of sulfonate surfactants also leads to greater blushing in the ultimate coating and consequently less rust and corrosion resistance. The utilization of greater amounts of the water insoluble nonionic surface active agent leads to less latex stability, but also results in less blushing and more water resistance (less water permeability). Accordingly, it is important to balance the amounts of sulfonate surfactant and nonionic surface active agent utilized in the charge composition. As a general rule, from about 4 to about 8 phm of the nonionic surface active agent will be utilized. At least about 4 phm of the nonionic surface active agent will be utilized. At least about 4 phm of the nonionic surface active agent is required to get good freeze-thaw resistance and the utilization of amounts in excess of about 8 phm results in poor water resistance. It is normally preferred to utilize from 4.5 phm to 6 phm of the nonionic surface active agent.

The free radical aqueous emulsion polymerizations used in preparing the latices of this invention are initiated with at least one free radical generator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-l-cyanocyclohexane, 1-t-amylazo-l-cyanocyclohexane, and the like, the various alkyl perketals, such as 2,2-bis-(t-butyl-peroxy)butane, and the like. Water soluble peroxygen free radical initiators are especially useful in such aqueous polymerizations.

The emulsion polymerizations of this invention are typically carried out at the temperature ranging between about 125° F. (52° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C. results in the polymer having a nonuniform distribution of repeat units in its backbone. The slow rates of polymerization experienced at such low temperatures are also undesirable because they greatly reduce the throughput of the polymerization reactor.

It is generally preferred for the polymerization temperature to be maintained within the range of about 130° F. (54° C.) to 185° F. (85° C.). It is generally more preferred for the reaction temperature to be controlled within the range of about 135° F. (57° C.) to about 175° F. (79° C.). It is important for the polymerization to be conducted at a pH which is below about 3.5 so that a water sensitive polymer is not produced. It is preferred for the pH of the polymerization medium to be maintained at a level of about 3.0 or less throughout the polymerization. As the polymerization proceeds, the pH of the polymerization medium will drop naturally. Thus, good results can be attained by adjusting the pH of the initial monomer charge composition to within the range of about 3.0 to about 3.5 and allowing the polymerization to proceed. In such a case the final pH of the polymerization medium will be about 1.5 which is highly satisfactory.

In commercial operations it is typically desirable to add about 15% to about 25% of the monomers in an initial charge. The initial charge is then allowed to react for a period of about 30 minutes to about 60 minutes. Then the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared.

In accordance with the process of this invention the latex synthesized is then neutralized with ammonia to a pH within the range of about 7 to about 10.5. It is normally preferred for the latex to be neutralized to a pH within the range of 8 to 10 and more preferred for the latex to be neutralized to a pH within the range of about 9.0 to about 9.5. This can be accomplished by simply dispersing ammonia throughout the latex to produce neutralized latex.

The latex formed can be diluted with additional water to the concentration (solids content) that is desired. This latex can be used in the preparation of water reducible coatings using techniques well-known to those skilled in the art. Generally, various pigments and plasticizers are added to the latex in the preparation of the water reducible coating. Poor adhesion is a problem that is sometimes encountered with water reducible resins. The adhesion of coatings made with water reducible resins to substrates can be greatly improved by the addition of a plasticizer and/or a coalescing solvent.

A film forming, water reducible composition can be prepared utilizing a mixture of the resin with suitable coalescing solvent and plasticizer. It is preferred for the coalescing solvent to be at least water miscible and even more preferably for it to be water soluble. Of the various solvents which can be used, generally the ethylene glycol monobutyl ether, ethylene glycol monoethyl ether, diethylene glycol monomethyl ether, diethylene glycol monoethyl ether and diethylene glycol monobutyl ether are preferred. It should be noted that the solvent and plasticizer can be mixed directly with the resin in its water emulsion or latex without its normal recovery in its dried form, in most instances, if desired. In such an operation, the composite would automatically be in a water reduced form, when sufficient ammonia is used.

Of the various plasticizers, it is desired that one be selected which is liquid at room temperature such as 25° C. and have a sufficiently high boiling point, preferably at least 100° C., and even more preferably, at least 150° C., so that they do not volatilize from the coating composition when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in The Encyclopedia of Polymer Science and Technology, Volume 3, Page 854, 1965, John Wiley and Sons, Inc., which is simply determined by the equation $$\partial = (\Sigma F)/V = F/MW/d$$

where
$\partial$ = solubility parameter
F = sum of the pertinent molar attraction constants of groups determined by Small, P A [(J Appl Chem 3, 71, (1953)]
V = Molar volume at 25° C.
MW = molecular weight
d = density at 25° C.

Various plasticizers can be used for this purpose. They can, for example, be of the type listed in the Federation Series on Coatings Technology, Unit Twenty-two, entitled "Plasticizers," published April, 1974, so long as they fulfill the melting point, boiling point and compatibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethylhexanoate), triethylene glycol dipelargonate and 2,2,4-trimethyl-1,3-pentane diol diisobutyrate.

Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly(α-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or α-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2(chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate dioctyl phthalates, di(2-ethylhexyl) phthalate, diisooctyl phthalate, di-tridecyl phthalate, n-hexyl n-decyl phthalate, n-octyl n-decyl phthalate, alkyl benzyl phthalate, bis(4-methyl-1,2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, butyl phthalyl butyl glycolate, ethyl (and methyl) phthalyl ethyl glycolate, polypropylene glycol bis(amyl) phthalate, hexyl isodecyl phthalate, isodecyl tridecyl phthalate and isooctyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl] adipate, di(2-ethylhexyl) adipate, diisodecyl adipate, dioctyl adipates (including diisooctyl adipate) n-hexyl n-decyl adipate, n-octyl n-decyl adipate, and di-n-heptyl adipate.

Representative examples of sebacic acid esters are dibutyl sebacate, di(2-ethylhexyl) sebacate, dibutoxyethyl sebacate, diisooctyl sebacate and diisopropyl sebacate.

Representative examples of azelaic acid esters are di(2-ethylhexyl) acelate dicyclohexyl acelate, diisobutyl azelate and diisooctyl azelate.

In the practice of this invention, the water reducible composition of resin, plasticizer and coalescing solvent, if used, is water reduced by neutralizing the carboxyl groups of the resin with ammonia and mixing with water. The resulting dispersion or solution can generally be characterized by being stable without appreciable, if any, precipitation of the resin for a period of at least thirty (30) days and preferably for a period of at least 365 days or more at about 25° C.

Generally, for the purpose of this invention about 100 to about 400 parts by weight water are used per 100 parts by weight neutralized resin, although more or less water can usually be used depending on whether a high or low viscosity dispersion or solution is desired or whether a high or low solids content is desired. It also depends on the type and amount of coalescing solvent and plasticizer used. The water reduced coating composition, as an aqueous dispersion or solution, is applied as a coating onto a suitable substrate such as wood, masonry, various plastics and various metals. The water, ammonia, and coalescing solvent are evaporated from the coating, usually at a temperature in the range of about 20° C. to about 100° C., preferably about 25° C. to about 50° C. to leave a substantially water insoluble coating of the coalesced resin and plasticizer. Generally such a coating can be prepared and applied without the need for additional hardening agents or curatives to decrease the water sensitivity.

Therefore, it is an important feature of this invention that a durable coating is formed on a substrate through the preparation of a particular resin having balanced hydrophilic and hydrophobic elements, preferably with a further balance of hard and soft segments, and the formation of a water reduced composition of such resin with a combination of coalescing solvent and compatible plasticizer.

The practice of the invention is more fully illustrated by reference to the following examples which are intended to be illustrative rather than limiting of the scope of the invention. All parts are by weight unless otherwise indicated.

EXAMPLE 1

In this experiment, a latex was prepared in a ten gallon (37.8 liter) reactor using the technique of this invention. The reactor utilized in this experiment was equipped with axial flow turbine type agitation and was operated at 150 rpm (revolutions per minute). A buffer solution and a monomer solution were made for utilization in the polymerization. The buffer solution was made by mixing 14.3 kilograms of water with 47.6 grams of the sodium dodecylbenzene sulfonate having a pH of about 6.5, 794 grams of Triton ™ X-165, 235 grams of sodium acid pyrophosphate (as a buffer) and 32 grams of ammonium persulfate. The monomer solution was prepared by mixing 8.3 kilograms of styrene, 16 grams of dodecylmercaptan, 7.1 kilograms of 2-ethylhexylacrylate, 318 grams of acrylic acid and 159 grams of methacrylic acid.

After the reactor had been evacuated for 30 minutes, the buffer solution was charged into the reactor. Then the monomer solution was charged into the reactor. The reactor was heated to a temperature of 135° F. (57° C.). Latex samples were taken as the polymerization proceeded to determine the solids content of the latex. The solids content of the latex increased during the course of polymerization as shown in Table I.

TABLE I

| Polymerization Time (Hours) | Solids Content |
|---|---|
| 0 | 0 |
| 2 | 8 |
| 4 | 11.1 |
| 6 | 14.7 |
| 8 | 18.4 |
| 10 | 21.5 |
| 12 | 27.7 |
| 14 | 35.3 |
| 16 | 45.5 |
| 17 | 50.3 |
| 18 | 54.0 |
| 19 | 56.3 |
| 21 | 56.9 |

After the latex reached a constant solids content the temperature was increased to 175° F. (79° C.) and maintained until the level of residual styrene monomer dropped to less than 0.05%. Then, 250 grams of amine was added.

The latex made utilizing this procedure had a final solids content of about 57%, a pH of about 9.5, a Brookfield viscosity of 300 centipoise, a surface tension of 36 dynes/cm., and passed 5 cycles of freeze-thaw stability testing. Films were cast from the latex for tensile testing and UV resistance testing. The resin proved to have excellent UV resistance and exhibited outstanding flexibility with elongations to break of over 500% being observed. The latex exhibited an excellent combination of properties for use in roof coating applications, exterior wood coating applications, flexible metal coating applications and plastic coating applications.

The water resistance of coatings made with the coating compositions of this invention can be improved by treating the coating composition with a carbodiimide. UCARLNK ™ Crosslinker XL-25SE from Union Carbide is a multifunctional carbodiimide that is well suited for this purpose. By utilizing such carbodiimides, water spotting and blushing can be virtually eliminated. As a general rule, the carbodiimide is added to the latex or coating composition in an amount which is within the range of about 10 phr to about 20 phr.

EXAMPLE 2

A standard roof coating formulation was prepared utilizing a latex prepared by the general procedure described in Example 1. This roof coating formulation was made by first mixing 57.6 kg of water, 7.4 kg of ethylene glycol, 454 grams of ammonia, 2.9 kg of Surfynol 104 (antifoam agent) 27.8 kg titanium dioxide, 236.9 kg calcium carbonate, and 3.7 kg of Nopcocide N-96 (antibacterial agent) under high shear conditions for 15 to 30 minutes. Then, 201.7 kg of the latex prepared by the general procedure described in Example 1, 11.1 kg of Santicizer 160 (plasticizer), 3.7 kg of Henkel DSX 1550 (urethane associative thickener), and 907 grams Drew L475 (defoamer). The rubber coating formulation was applied to roof surfaces and found to be excellent in such applications. The formulation demonstrated excellent flexibility and outstanding ultra-violet light resistance.

Such highly desirable roof coating formulations can be prepared by mixing 30% to 40% of the neutralized latex of this invention with 38% to 48% calcium carbonate, 2% to 10% titanium dioxide, 5% to 15% additional water, 0.5% to 2% ethylene glycol, 0.05% to 0.2% ammonia, 0.02% to 1.5% antifoam agent, 1% to 5% plasticizer, 0.2% to 1.5% antibacterial agent and 0.2% to 1.5% thickener.

While certain representative embodiments and details have been shown for the purpose of illustrating the invention, it will be apparent to those skilled in this art that various changes and modifications may be made therein without departing from the scope of the invention.

What is claimed is:

1. A process for producing a neutralized latex that is useful in the manufacture of water reducible coatings with comprises:
    (1) free radical aqueous emulsion polymerizing, at a pH of less than about 3.5, a monomer mixture which comprises, based on 100 weight percent monomers; (a) from about 30 to abut 70 weight percent of a vinyl aromatic monomer selected from the group consisting of styrene, α-methyl styrene, and vinyl toluene, (b) from about 25 to about 65 weight percent of at least one alkyl acrylate monomer having an alkyl group which contains from 2 to about 10 carbon atoms, and (c) from about 1 to about 5 weight percent of acrylic acid, and (d) about 0.4 to about 3 weight percent methacrylic acid; in the presence of about 0.2 to about 0.4 phm at least one sulfonate surfactant and in the presence of about 4 to 8 phm of at least one nonionic surface active agent having a hydrophile-lipophile balance number which is within the range of about 14 to about 18 to produce a latex; and
    (2) neutralizing the latex with ammonia to a pH which is within the range of about 7 to about 10.5 to produce the neutralized latex.

2. The neutralized latex made by the process specified in claim 1.

3. A water reducible coating composition made utilizing the neutralized latex specified in claim 2, 4. A process as specified in claim 1 wherein the monomer mixture is comprised of (a) from about 40 to about 60 weight percent vinyl aromatic monomers, (b) from about 35 to about 55 weight percent of at least one alkyl acrylate monomer, (c) from about 1 to about 3 weight percent of acrylic acid, and (d) from about 0.6 to about 2 weight percent methacrylic acid, said percentages being based on total monomers.

5. A process as specified in claim 4 wherein said free radical aqueous emulsion polymerization is conducted at a temperature within the range of about 52° C. to about 88° C.

6. A process as specified in claim 4 wherein the vinyl aromatic monomer is styrene.

7. A process as specified in claim 6 wherein the alkyl acrylate monomer is 2-ethylhexyl acrylate.

8. A process as specified in claim 7 wherein the sulfonate surfactant is a metal salt of an alkylbenzene sulfonate.

9. A process as specified in claim 1 wherein the monomer mixture is comprised of (a) from about 47 to about 57 weight percent styrene, (b) from about 40 to about 50 weight percent 2-ethylhexylacrylate, (c) from about 1.5 to about 2.5 weight percent acrylic acid, and (d) from about 0.8 to about 1.5 weight percent methacrylic acid.

10. A process as specified in claim 9 wherein the free radical aqueous emulsion polymerization is conducted at a temperature within the range of about 52° C. to about 88° C.

11. A process as specified in claim 1 wherein the water insoluble nonionic surface active agent has a hydrophile-lipophile balance number which is within the range of about 14 to about 18.

12. A process as specified in claim 7 wherein the sulfonate surfactant is sodium dodecylbenzene sulfonate.

13. A process as specified in claim 9 wherein the nonionic surface agent has a hydrophile-lipophile balance number which is within the range of about 15 to about 17.

14. A process as specified in claim 11 wherein the nonionic surface agent is present at a level within the range of about 4.5 to about 6.0 phm and wherein the sulfonate surfactant is present at a level within the range of about 0.25 to about 0.35 phm.

15. A process as specified in claim 1 wherein said polymerization is conducted at a pH of less than about 3.0.

16. A process as specified in claim 1 wherein said nonionic surface active agent is a water insoluble nonionic surfactant having the structural formula:

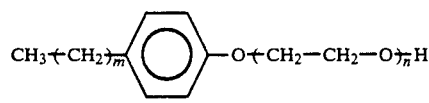

wherein n is an integer from about 8 to about 50 and wherein m is an integer from about 6 to about 12.

17. A process as specified in claim 16 wherein n averages from about 12 to about 20.

18. A process as specified in claim 17 wherein m is 8.

19. A process as specified in claim 17 wherein m is 9.

20. A roof coating formulation which is comprised of 30% to 40% of the neutralized latex specified in claim 2, 38% to 48% calcium carbonate, 2% to 10% titanium dioxide, 5% to 15% additional water, 0.5% to 2% ethylene glycol, 0.05% to 0.2% ammonia, 0.02% to 1.5% antifoam agent, 1% to 5% plasticizer, 0.2% to 1.5% antibacterial agent and 0.2% to 1.5% thickener.

* * * * *